United States Patent [19]

Suzuki et al.

[11] Patent Number: 4,787,936
[45] Date of Patent: Nov. 29, 1988

[54] HYDRAULIC CEMENT-BASED COMPOSITION FOR DIP COATING OF STEEL AND IRON ARTICLES

[75] Inventors: Kiyoshi Suzuki, Kanagawa; Toshiaki Murata; Isao Nakata, both of Tokyo, all of Japan

[73] Assignees: Zairyo Kagaku Kenkyusho Co., Ltd.; Mitsui Engineering & Shipbuilding Co., Ltd., both of Tokyo, Japan

[21] Appl. No.: 78,238

[22] Filed: Jul. 27, 1987

[30] Foreign Application Priority Data

Jul. 28, 1986 [JP] Japan .................................. 61-176898

[51] Int. Cl.$^4$ .............................................. C04B 24/00
[52] U.S. Cl. ...................................... 106/90; 106/92; 106/94
[58] Field of Search ............................... 501/90, 92, 94

[56] References Cited

U.S. PATENT DOCUMENTS

| | | | |
|---|---|---|---|
| 2,491,487 | 12/1949 | Faulwetter | 106/94 |
| 3,885,985 | 5/1975 | Serafin et al. | 106/92 |
| 3,936,311 | 2/1976 | Kirst et al. | 106/92 |

OTHER PUBLICATIONS

Hiemenz, P. C., *Principles of Colloid and Surface Chemistry*, Marcel Dekker, Inc., New York, 1986, p. 423.

*Primary Examiner*—William R. Dixon, Jr
*Assistant Examiner*—David M. Brunsman
*Attorney, Agent, or Firm*—Jules E. Goldberg

[57] ABSTRACT

The inventive cement-based composition is useful as a coating material for corrosion-resistant protection on steel and iron surfaces. The composition is basically a polymer cement composition prepared by compounding a hydraulic cement with an aqueous emulsion of a polymeric constituent but characteritically the inventive composition is prepared by adding an aqueous emulsion of a hydrocarbon solvent such as kerosene containing a combination of surface active agents, i.e. oil-soluble non-ionic, water-soluble non-ionic and water-soluble cationic ones, and a saccharide compound such as glucose. By virtue of the unique formulation, the composition has a greatly extended pot-life suitable for coating works of, for example, steel rods and pipes by the dip coating method.

5 Claims, No Drawings

HYDRAULIC CEMENT-BASED COMPOSITION FOR DIP COATING OF STEEL AND IRON ARTICLES

BACKGROUND OF THE INVENTION

The present invention relates to a hydraulic cement-based composition having a relatively long pot-life suitable for dip coating of the surface of steel- or iron-made articles, such as reinforcing rods for ferroconcrete, steel strings and sheaths for pre-stressed concrete, pipes and pipe joints made of steel or cast iron and the like. More particularly, the invention relates to a so-called polymer cement-based coating composition mainly composed of a hydraulic cement and capable of forming a protecting cured cement-based anti-corrosion coating layer to withstand the attack of a salty atmosphere with good adhesion between the substrate surface and the coating layer.

Some of steel- or iron-made articles are usually required, depending on the intended application thereof or the circumstances under which they are used, to have high corrosion resistance, to excellently withstand the influences of salty atmospheres and to have good adhesion with mortars and concretes in which they are embedded. Such requirements are usually satisfied by forming a protective coating layer on the surface of the substrate articles while such a protective coating is required to have particularly high adhesion to the substrate surface and flexibility not to be cracked by bending of the coated articles.

It is known that an organic-inorganic composite material or a so-called polymer cement composition composed of a hydraulic cement and an emulsion of a polymer can provide a very powerful protective coating layer on the surface of steel- and iron-made articles with excellent adhesion so that polymer cement compositions are highlighted in recent years as a heavy-duty anti-corrosion coating material on steel and iron. In contrast thereto, conventional anti-corrosion coating compositions for steel and iron are nothing more than a coating material to form a coating film on the steel surface merely to shield water and oxygen as the principal factors responsible for the formation of rust on the surface.

In comparison with the conventional anti-corrosion coating compositions on steel and iron, polymer cement compositions are very desirable materials capable of chemically forming a surface film of passive state expressed by the formula of gamma-ferrite $\gamma\text{-Fe}_2\text{O}_3\cdot n\text{H}_2\text{O}$ on the substrate surface by virtue of the strong alkalinity of the aqueous polymer cement composition having a pH of 12.5 or even higher. Disadvantageously, however, the passive-state surface film formed in this manner has a very small thickness of only 2 to 7 nm so that it is readily damaged under mechanical action and, in addition, the film is readily destroyed when the surface is brought into contact with anionic ions such as chlorine ions $Cl^-$ and sulfate ions $SO_4^{--}$. The polymer cement composition can provide a durable protective coating layer on the anti-corrosion passive-state surface film on steel and iron since the coating layer formed by curing a polymer cement composition is very tenacious and has excellent weatherability and mechanical strengths to provide physical or mechanical protection as being composed of the hydraulic cement and the polymer, optionally, together with aggregates.

In addition to the good adhesion to the surface of steel- or iron-made articles, polymer cement compositions composed of a hydraulic cement and a polymeric constituent added in the form of an aqueous emulsion are very versatile in respect of the rigidity or flexibility after curing by modifying the mixing ratio of the components. Namely, the cured coating layer may have increased rigidity by increasing the proportion of the hydraulic cement in the polymer cement composition while the cured coating layer can be imparted with good flexibility by decreasing the content of the hydraulic cement relative to the polymeric constituent in the composition. Such versatility of the coating layer relative to the rigidity or flexibility can never be obtained by any anti-corrosion protective coating compositions of other types.

One of the serious problems in the polymer cement compositions is the relatively short pot-life of the ready-prepared composition before the coating works. Namely, a polymer cement composition is prepared basically by compounding a hydraulic cement with an aqueous emulsion of a polymer as a vehicle so that the hydraulic curing reaction by hydration of the cement immediately starts when the hydraulic cement is blended with the aqueous emulsion and the consistency of the composition is gradually increased leading to the loss of the flowability of the composition within a relatively short time. No coating works can of course be undertaken with such a non-flowable composition which finally is solidified to be disposed by discarding. This problem of short pot-life practically prohibits the conventional process of coating works by dipping the steel-made articles in a bath of the polymer cement composition. Accordingly, it has been eagerly desired to develop a polymer cement composition greatly improved in respect of the pot-life after preparation of the composition without affecting the advantageous properties of the polymer cement compositions in general so that the coating works of steel- and iron-made articles can be performed by the most efficient and economical process of dip coating.

In this connection, the inventors have previously proposed an improved polymer cement composition capable of being stored with stability over a very long period of time of, for example, 2 years or even longer (see Japanese Patent Publication 57-54065). Characteristically, the storage stability of the polymer cement composition disclosed there can be increased by increasing the fineness of the particles of the hydraulic cement. Accordingly, it is a necessary step for the preparation of the polymer cement composition that the mixture of a hydraulic cement and the emulsion of a polymeric constituent must be subjected to prolonged mechanical grinding in a milling machine such as ball mills to have the cement particles suspended in the vehicle.

The storage stability of a polymer cement composition of 2 years or longer, however, is an overly extension of life more than practical significance. For example, a storage stability or pot-life of about 1 month would be sufficient from the standpoint of practical application of polymer cement compositions. Accordingly, the inventors have previously proposed an improved polymer cement composition which is prepared by compounding a colloid cement having a particle diameter reduced to 45 $\mu$m or smaller beforehand so that the lengthy process of grinding after compounding can be omitted (see "Polymer Cement Coating Compositions", published by New Technology & Science Co., 1986, pages 178 to 187).

In the United States, a serious problem has been reported since 1970 that calcium chloride scattered on deposited snow with an object of accelerating thawing in winter causes heavy corrosion of steel rods embedded in reinforced conrete bodies by penetrating the concrete layer. Therefore, the road-managing authorities of the United States have to pay a great expense for the re-construction and maintenance of bridges and other structures under shortened durability due to corrosion of steel by the salty snow. A proposed solution for this problem is to provide steel rods with a coating layer of an epoxy resin by the techniques of electrostatic powder coating and the investigations for this process has been completed in about 1973 to enter the practical application of the process in the country and abroad (Cliften, Jr., H. F. Beeghly and R. G. Mathey, Non-metallic Coating for Concrete Reinforcing Bars, FHWA-RD-74-18, 1974). Although these epoxy-coated steel bars have no particular problems in respect of the resistance against salty atmosphere, they have several disadvantages including:

(1) increased cost of the steel bars of 1.5 to 1.85 times of that of uncoated ones; ones;
(2) poor adhesion of the steel bars to mortar or concrete decreased by about 20%; and
(3) danger of pinhole formation when the coated steel bars are worked by bending.

It was also practiced in the United States since the beginning of this century to provide the inner walls of medium-diameter steel pipes for water service having a diameter of 750 mm or larger with a lining layer of cement mortar. A problem in this mortar lining was the poor adhesion of the lining layer to the steel surface and, so to say, the lining layer adhered to the steel surface by a mere mechanical arching effect and was susceptible to cracking and falling under external forces. Moreover, such a mortar lining layer was also poor in the water-shielding effect so that the lining layer of cement mortar on the inner walls of a water service pipe was neutralized within about 20 years to a depth of several centimeters from the surface requiring repair of the degradation.

Accordingly, it has been eagerly desired to develop a coating compositon capable of forming a coating layer on steel and iron surfaces having a very long durability of, for example, at least 50 years when a lining layer is formed on the inner surface of a pipe of steel or cast iron for water service and other steel-made structures such as pipes for crude oil mining by use of the coating composition.

SUMMARY OF THE INVENTION

The present invention, which has been completed as a result of the extensive investigations with an object to satisfy the above mentioned requirements, provides a polymer cement composition which comprises:
(a) 100 parts by weight of a hydraulic cement;
(b) from 10 to 36 parts by weight of an aqueous emulsion of a polymer capable of exhibiting good adhesion to the surface of steel and withstanding the attack of chloride ions, the amount of the emulsion being calculated as the content of the polymer therein; and
(c) from 3 to 30 parts by weight of an aqueous emulsion of a hydrocarbon solvent containing from 0.5 to 2.0% by weight of a saccharide compound and a combination of from 0.8 to 2.0% by weight of a first non-ionic surface active agent soluble in the hydrocarbon solvent having an HLB value in the range from 10 to 14.5, from 0.8 to 2.0% by weight of a second non-ionic surface active agent soluble in water having an HLB value in the range from 15 to 18 and from 0.3 to 1.0% by weight of a cationic surface active agent soluble in water, the amount of the emulsion being calculated as the content of the hydrocarbon solvent and the amounts of the saccharide compound and the surface active agents each being based on the amount of the hydrocarbon solvent contained in emulsion.

It is of course optional that the above defined polymer cement composition is admixed with an aggregate material, e.g., sand, in an amount, for example, not exceeding 200 parts by weight per 100 parts by weight of the hydraulic cement.

DETAILED DESCRIPTION OF THE PREFERRED EMBODIMENTS

As is understood from the above given summary of the invention, the most chartacteristic component in the inventive polymer cement composition is the component (c) which is an aqueous emulsion of a hydrocarbon solvent with admixture of a specific additive and emulsified by use of a specific combination of surface active agents.

The principal ingredient in the inventive polymer cement composition is a hydraulic cement which is not particularly limitative to a particular type including portland cements, slug cements and other mixed cements for the polymer cement coating composition or polymer cement mortar coating composition. The hydraulic cement should have a particle size distribution as fine as possible. In this regard, a grade of portland cement sold under the name of a colloid cement having an average particle diameter of about 8 $\mu$m or smaller is particularly suitable.

The polymer which is blended with the hydraulic cement in the form of an aqueous emulsion should exhibit high adhesion to the substrate surface and should be capable of withstanding sea water. Although the type of the polymer is not particularly limitative provided that the above mentioned requirements are satisfied, suitable aqueous emulsions of a polymer include latexes of rubbery polymers such as styrene-butadiene copolymeric rubbers (SBR), isoprene rubbers (IR), and acrylonitrile-butadiene rubbers (NBR) and emulsions of poly(acrylic acid esters), ethylene-vinyl acetate copolymeric resins and acrylic acid-vinyl acetate copolymeric resins as well as rosin-modified phenolic resins and cyclized rubber modified with phthalic acid. Two-package type resin emulsions are also suitable as the polymer emulsion including emulsions of emulsifiable epoxy resins and emulsifiable urethane resins which should be used in combination with a respective curing agent. The amount of the curing agent which may be a conventional one, when used in combination with the resin emulsion, should be minimized so that the curing reaction of the resin takes place only at about 70° to 80° C. which is the temperature at which steam curing of the coating layer on the substrate surface is undertaken. An excessively large amount of the curing agent is undesirable because of eventual curing of the resin when the polymer cement composition is still in the dip tank.

The amount of the above described aqueous emulsion of the polymer in the inventive composition should be in the range from 10 to 30 parts by weight calculated as the content of the polymeric constituent per 100 parts by weight of the hydraulic cement. When the amount of the polymer emulsion is too small, no sufficient improvements can be obtained of the coating layer formed of the composition in respect of the adhesion to the steel surface, water-impermeability and resistance against salty atmosphere. When the amount of the polymer emulsion is too large, on the other hand, the coating layer after curing may have somewhat decreased hardness or mechanical strengths. When the polymer cement composition of the invention contains no aggregate material, the amount of the polymer emulsion should be relatively small in the range from 10 to 30 parts by weight per 100 parts by weight of the hydraulic cement while the amount thereof should preferably be somewhat larger in the range from 15 to 36 parts by weight per 100 parts by weight of the hydraulic cement when the polymer cement composition contains a substantial amount of an aggregate material.

The most characteristic ingredient in the inventive polymer cement composition is the component (c) which is an aqueous emulsion of a hydrocarbon solvent. Although such a hydrocarbon solvent can be emulsified by use of an anionic or cationic surface active agent alone, the emulsion should be prepared by use of a combination of a first non-ionic surface active agent soluble in the hydrocarbon aolvent, a second non-ionic surface active agent soluble in water and a cationic surface active agent soluble in water. The first non-ionic surface active agent should have a value of HLB in the range from 10 to 14.5 or, preferably, from 12 to 14 while the second non-ionic surface active agent should have a value of HLB in the range from 15 to 18 or, preferably, from 16 to 17. In the preparation of the aqueous emulsion of the hydrocarbon solvent, a convenient way is that the first non-ionic surface active agent is dissolved beforehand in the hydrocarbon solvent and the surfactant-containing solvent is emulsified in an aqueous medium containing the second non-ionic surface active agent and the cationic surface active agent in combination. Preferable amounts of these surface active agents are from 0.8 to 2.0% by weight, from 0.8 to 2.0% by weight and from 0.3 to 1.0% by weight for the first non-ionic, second non-ionic and cationic surface active agents, respectively.

The hydrocarbon solvent prepared in the form of an aqueous emulsion should of course be immiscible with water and suitable hydrocarbon solvents include kerosene, mineral spirit, precipitation naphtha, rubber solvent and the like. Though not particularly limitative, the content of the hydrocarbon solvent in the aqueous emulsion should preferably be as high as possible provided no phase inversion takes place from an oil-in-water type to water-in-oil type. A content of 60% by weight or more of the hydrocarbon solvent can readily be obtained.

The aqueous emulsion of the hydrocarbon solvent also should contain a water-soluble saccharide compound which is dissolved beforehand in the aqueous medium in which the hydrocarbon solvent is to be emulsified. Suitable saccharide compound includes monosaccharides and disaccharides exemplified by glucose, fructose and sucrose. The amount of the saccharide compound in the aqueous emulsion of the hydrocarbon solvent should be in the range from 0.5 to 2.0% by weight based on the hydrocarbon solvent.

The aqueous emulsion of the hydrocarbon solvent prepared in the above described manner should be added to the inventive polymer cement composition in an amount in the range from 3 to 30 parts by weight per 100 parts by weight of the hydraulic cement calculated for the content of the hydrocarbon solvent. When the amount thereof is too small, the polymer cement composition cannot be imparted with sufficient stability while an excessively large amount of the aqueous emulsion of the hydrocarbon solvent is undesirable due to the possible inhibitive effect on the hydration of the hydraulic cement to retard curing of the composition. Such instability of the inventive polymer cement composition is caused also when the amount of the saccharide compound is too small or the amounts of the surface active agents are too small. A too large amount of the saccharide compound in the composition also has an inhibitive effect on the hydration of the hydraulic cement while a too large amount of the surface active agent is detrimental to the mechanical strengths of the coating layer formed by curing of the composition on the substrate surface.

As is mentioned before, the polymer cement composition of the invention may, optionally or rather preferably in most applications, be admixed with a substantial amount of an aggregrate material when, in particular, it is desired to have an increased thickness or an increased hardness of the coating layer. An aggregate material suitable for use in the inventive polymer cement composition is a finely pulverized particulate material such as #8 silica sand and the like when the composition is used for coating of steelor iron-made articles by dip coating. The amount of the aggregate material in the inventive composition should not exceed 200 parts by weight per 100 parts by weight of the hydraulic cement since a too large amount of the aggregate material is responsible for the appearance of brittleness in the coating layer after curing while no substantial improvement would not be obtained when the amount of the aggregate material is too small or, for example, smaller than 50 parts by weight per 100 parts by weight of the hydraulic cement. A typical formulation of the inventive polymer cement composition contains the aggregate material in an amount in the range from 70 to 150 parts by weight per 100 parts by weight of the hydraulic cement.

It is of course optional that the polymer cement composition of the invention is admixed with various kinds of known additives according to need including thickening agents, antifoam agents, antiseptic agents and the like although the particular formulation of the inventive composition can be varied in a wide range depending on the types of the steel- or iron-made articles to be coated as well as the desired effect of coating.

Although the polymer cement composition of the invention is applied to the substrate surface by any conventional method, the most efficient way for providing a coating layer of the composition on the steel surface is dip coating. When a steel rod for concrete reinforcement is coated with the inventive polymer cement composition, the surface of the steel rod should first be freed from any rust and greasy matter followed by surface conditioning by sand blast, shot blast and the like method. The surface-conditioned steel rod is dipped in a bath of the inventive polymer cement composition, pulled up therefrom and kept standing for a while until tack-free drying of the surface followed by steam curing at a temperature of 70° to 80° C. for 60 to 90 minutes. After spontaneous cooling to room temperature, the coated steel rod is further seasoned for about 1 week in water and then for about 3 weeks in air. When a small-diameter steel pipe is coated with the composition on both of the inner and outer surfaces, a standard procedure is that the inner surface is first provided with a lining layer of the composition by the centrifugal method and, after tack-free drying of the inner lining layer, the outer surface of the pipe is coated by dip coating.

Irrespective of the presence of absence of an aggregate material, the polymer cement composition or polymer cement mortar composition of the invention may have an adequately extended pot-life so that the inventive composition is suitable for use in dip coating of various kinds of steel- and iron-made articles and the thickness of the coating layer can be controlled by the adjustment of the consistency of the composition. Namely, various kinds of substrate articles can be provided with a coating layer of the polymer cement composition efficiently in a continuous process by dipping the substrate bodies in a bath of the inventive polymer cement composition having an adequately controlled consistency and pot-life so that the loss of the coating material in the coating works can be reduced to as small as 2% or even smaller, which is a great improvement over the conventional coating material applied to the substrate surface by spraying in which the loss of the coating material may sometimes exceeds 30 to 35%. As is readily under-stood, moreover, the dip coating method has much higher productivity than other coating methods since a large number of the substrate bodies can be dipped at one time in the dipping bath and the coating works can be completed within a short time so that the industrial advantages obtained by using the inventive polymer cement composition are very large. Different from the method of spraying, in addition, the method of dip coating is applicable to the coating works of a substrate body of any complicated forms. For example, a uniform lining layer can be obtained with the inventive polymer cement composition on the inner walls of small-diameter steel pipes having a diameter of 6 to 10 mm. The coating layer obtained by curing the inventive polymer cement composition is substantially impermeable to water and firmly adheres to the substrate surface so that the surface is provided with a protective coating with durability over a long period of time.

In the following, the polymer cement composition of the invention is described in more detail by way of examples. In the following description, the expression of "%" and the term of "parts" all refer to "% by weight" and "parts by weight", respectively.

EXAMPLE 1

An aqueous emulsion of hydrocarbon solvents was prepared by vigorously agitating a mixture composed of 35.3% of kerosene, 23.5% of mineral spirit, 24.0% of water, 1.2% of an oleophilic nonionic surface active agent, 1.0% of a hydrophilic non-ionic surface active agent, 0.4% of a cationic surface active agent, 1.3% of glucose, 2.0% of a 10% aqueous solution of acetic acid and 11.3% of an antifoam agent containing 2% of the effective ingredient.

A polymer cement composition was prepared by uniformly blending the components with addition of the above prepared emulsion of the hydrocarbon solvents. The formulation included: 100 parts of a colloid cement (a product by Nittetsu Cement Co.), 40 parts of an SBR latex containing 30% of solid and a cationic surface active agent (Cementex, an SBR emulsion product by Obanaya Sangyo (Co.), 30 parts of the above prepared aqueous emulsion of the hydrocarbon solvents, 7.2 parts of a 2% aqueous solution of a methyl cellulose (Hi-Metolose, a grade of methyl cellulose product of Shin-Etsu Chemical Co.), 0.09 part of an antiseptic agent (Deltop, an iodine containing organic compound a product by Takeda Pharmaceutical Co.) and 0.018 part of an antifoam agent (Pulronic L-61, a block polymer polyoxyalkylene glycol a product by Asahi CHemical Co.).

The thus prepared polymer cement composition was used for coating of steel bars for concrete reinforcement by the method of dip coating. Thus, five deformed reinforcing steel bars each having a diameter of 19 mm and a length of 5,500 mm was subjected to surface conditioning by sand blasting to be freed from the rust and deposited matter on the surface. The surface-conditioned steel bars were held upright and dipped in a dip tank containing the polymer cement composition and pulled up gradually while a small vibrating motion was applied thereto. This procedure could be performed so efficiently that the loss of of the polymer cement composition was negligibly small. The thus coated steel bars were kept in air at 25° C. so that the surface became dried tack-free after 24 hours and then steam-cured at a temperature of 60° to 70° C. for about 2 hours followed by spontaneous cooling to room temperature. Further, the coated steel bars were subjected to seasoning by keeping in a water tank for 7 days and then in air for additional 21 days.

The coating layer of the cured polymer cement composition on the steel bar surface obtained in the above described manner was substantially uniform having a thickness of about 0.2 mm on an average. The quality of the polymer cement coating layer was evaluated by conventional testing procedures to obtain quite satisfactory results of testing in respects of the adhesion to cement concrete bodies, anti-cracking resistance by bending of the steel bar and water-impermeability so that the thus coated steel bars were estimated to be semi-permanently durable without rusting even when they were embedded in a cement concrete containing sea sand as an aggregate material.

EXAMPLE 2

A polymer cement mortar composition was prepared by adding, to the polymer cement composition prepared in Example 1, 150 parts of #8 silica sand as an aggregate material and additional 7 parts as solid of the same SBR latex together with a small volume of water to adjust the consistency, each amount given in parts being per 100 parts of the colloid cement.

Coating of steel bars with this polymer cement mortar composition and curing of the composition were undertaken in substantially the same manner as in Example 1. The coating layer was also substantially uniform all over the surface having a thick-ness of about 0.5 to 1.0 mm on an average.

The results of the evaluation tests of the coating layer indicated that the coating layer had excellent adhesion to the concrete body, water-impermeability and corrosion resistance against saline water. The surface hardness was remarkably higher than the coating layer in Example 1. Accordingly, the thus coated steel rods could be expected to have a greatly extended serviceable life without rusting over those coated with a conventional coating composition.

EXAMPLE 3

A polymer cement composition was prepared by uniformly blending 100 parts of the same colloid cement as used in Example 1, 18 parts as solid of an aqueous expoxy emulsion containing 55% of non-volatile matter (EP-4100, a product by Asahi Denka Kogyo Co.), 3.6 parts of a modified aliphatic amine as a curing agent, 30 parts of the aqueous emulsion of the hydrocarbon solvents prepared in Example 1, 7 parts of water, 7.2 parts of the same aqueous solution of methyl cellulose as used in Example 1, 0.09 part of Deltop (see Example 1) and 0.018 part of Pulronic (see Example 1).

Separately, a polymer cement mortar composition was prepared with the same formulation as above but with further addition of 120 parts of #8 silica sand and additional 10 parts as solid of the same epoxy emulsion.

An 80A steel pipe having an outer diameter of 89.1 mm and an inner diameter of 80.5 mm and provided at each end on the outer surface with a screw thread for mounting of a joint was, after surface conditioning, dipped in a bath of the above prepared polymer cement composition and pulled up from the bath followed by curing in air for 2 to 3 days so that the pipe was provided with a coating layer of about 0.1 to 0.15 mm thickness on the outer and inner surfaces.

The thus coated steel pipe was, after filling with an adequate volume of the above prepared polymer cement mortar composition and stoppered at both ends, was tumbled in a horizontal disposition so as to have the inner surface thereof uniformly coated with the cement mortar composition. Thereafter, the pipe was mounted on a centrifugal casting machine and rotated first at about 700 rpm for 1 to 2 minutes and then at 1500 rpm for 3 to 5 minutes so that the resulting lining layer having a thickness of 5 to 6 mm had a uniform and smooth surface. The pipe demounted from the machine was held in a horizontal disposition for about 7 days in air to effect curing of the coating composition. The curing schedule could be shortened by undertaking, instead of 7 days of curing in air, steam curing at 60° to 70° C. for about 30 minutes after 1 to 2 days of curing in air.

The thus lined steel pipe was, after standing in air for several hours, was dipped in a dip tank containing the polymer cement mortar composition and pulled up therefrom to have the outer surface coated with the composition. The coating layer had a thickness of about 0.5 mm. The coated steel pipe was held upright in air for 1 to 2 days so that the surface was dried tack-free followed by steam curing at 70° to 80° C. for 1 to 2 hours and seasoning first in water for 7 days and then in air for 14 days piror to inspection of the product quality.

The items in the product inspection according to JIS K 5500 included: visual inspection of the outer appearance; visual inspection of the inner surface using a fiberscope for the surface smoothness, bubbles, blisters, falling of coating and other defects; pinhole test; and thickness determination of the coating layers for all of the product pipes; and shock resistance test, accelerated weathering test for 250 hours, boiling water resistance test, salt water resistance test, gasoline resistance test and salt water spray test for several of the product pipes taken by sampling. The results of the testing were as follows. Namely, all of the coated pipes passed the tests for the appearance of outer and inner surfaces and the pinhole test although a small number of pinholes were found though within a permissible limit. The thickness of the lining layer on the inner surface was 4.8 to 5.1 mm. Further, the tests for the coated pipes taken by sampling gave the results that all items could be passed.

In view of the results of the above mentioned tests, the thus coated steel pipes are useful for services as a piping material not only for water service as a matter of course but also for underground transportation duct of sea water sometimes containing sand, crude oil, petroleum products, hot water gases and the like. It would be a fair estimation that the steel pipes coated with the inventive coating compositions could have a durability of at least 50 years in the above mentioned services when the coating layer has a thickness of 5 mm or more having a water permeability of 0.1% or below.

What is claimed is:

1. A cement-based coating composition which comprises:
    (a) 100 parts by weight of a hydraulic cement;
    (b) from 10 to 36 parts by weight of an aqueous emulsion of a polymer capable of exhibiting good adhesion to the surface of steel and withstanding the attack of chloride ions, the amount of the emulsion being calculated as the content of the polymer therein; and
    (c) from 3 to 30 parts by weight of an aqueous emulsion of a hydrocarbon solvent containing from 0.5 to 2.0% by weight of a saccharide compound and a combination of from 0.8 to 2.0% by weight of a first non-ionic surface active agent soluble in the hydrocarbon solvent having an HLB value in the range from 10 to 14.5, from 0.8 to 2.0% by weight of a second non-ionic surface active agent soluble in water having an HLB value in the range from 15 to 18 and from 0.3 to 1.0% by weight of a cationic surface active agent soluble in water, the amount of the emulsion being calculated as the content of the hydrocarbon solvent and the amounts of the saccharide compound and the surface active agents each being based on the amount of the hydrocarbon solvent combined in the emulsion.

2. The cement-based coating composition according to claim 1 which further comprises from 50 to 200 parts by weight of an aggregate material per 100 parts by weight of the hydraulic cement.

3. The cement-based coating composition according to claim 1 wherein the polymer in the aqueous emulsion as the component (b) is selected from the group consisting of styrene-butadiene copolymeric rubbers, isoprene rubbers, acrylonitrile-butadiene rubbers, poly(acrylic acid esters), copolymers of ethylene and vinyl acetate, copolymers of acrylic acid and vinyl acetate, rosin-modified phenolic resins, phthalic acid-modified cyclized rubbers and epoxy resins.

4. The cement-based coating composition according to claim 1 wherein the saccharide compound is selected from the group consisting of glucose, fructose and sucrose.

5. The cement-based coating composition according to claim 1 wherein the hydrocarbon solvent is selected from the group consisting of kerosene, mineral spirit, and precipitation naphtha.

* * * * *